(12) United States Patent
Sasaki

(10) Patent No.: US 8,743,576 B2
(45) Date of Patent: Jun. 3, 2014

(54) BOOST TYPE SWITCHING POWER SUPPLY DEVICE INCLUDING POWER FACTOR IMPROVEMENT CIRCUIT

(75) Inventor: Masato Sasaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 467 days.

(21) Appl. No.: 13/161,628

(22) Filed: Jun. 16, 2011

(65) Prior Publication Data

US 2012/0075889 A1 Mar. 29, 2012

(30) Foreign Application Priority Data

Sep. 24, 2010 (JP) ................................. 2010-214505

(51) Int. Cl.
*H02M 7/217* (2006.01)
(52) U.S. Cl.
USPC .......................................................... 363/89
(58) Field of Classification Search
USPC .......................................................... 363/89
See application file for complete search history.

(56) References Cited

U.S. PATENT DOCUMENTS

| | | | | |
|---|---|---|---|---|
| 5,001,620 | A * | 3/1991 | Smith ............................. | 363/89 |
| 5,612,609 | A | 3/1997 | Choi | |
| 7,042,743 | B2 * | 5/2006 | Pidutti et al. .................... | 363/89 |
| 7,397,678 | B2 * | 7/2008 | Frank et al. ..................... | 363/89 |
| 7,919,950 | B2 | 4/2011 | Uno et al. | |
| 8,098,505 | B1 * | 1/2012 | Choi ............................... | 363/89 |
| 8,143,866 | B2 * | 3/2012 | Fagnani et al. ................. | 323/222 |
| 8,207,713 | B2 * | 6/2012 | Sugawara ....................... | 323/222 |
| 8,320,144 | B2 * | 11/2012 | Lee .................................. | 363/89 |
| 8,379,423 | B2 * | 2/2013 | Park et al. ....................... | 363/89 |
| 8,467,209 | B2 * | 6/2013 | Adragna .......................... | 363/89 |
| 8,513,926 | B2 * | 8/2013 | Park et al. ....................... | 323/207 |
| 2005/0207193 | A1 * | 9/2005 | Adragna .......................... | 363/89 |
| 2009/0190382 | A1 | 7/2009 | Usui | |
| 2012/0008351 | A1 * | 1/2012 | Yonezawa et al. .............. | 363/89 |
| 2012/0075889 | A1 * | 3/2012 | Sasaki ........................ | 363/21.09 |

FOREIGN PATENT DOCUMENTS

| | | |
|---|---|---|
| JP | 2002-320378 A | 10/2002 |
| JP | 2003-125585 A | 4/2003 |
| JP | 3456583 B2 | 10/2003 |
| JP | 2009-177954 A | 8/2009 |
| WO | WO 2009/008197 A1 | 1/2009 |

* cited by examiner

*Primary Examiner* — Jeffrey Sterrett
(74) *Attorney, Agent, or Firm* — Birch, Stewart, Kolasch & Birch, LLP

(57) ABSTRACT

A switching power supply device includes: a fundamental wave component extraction circuit for extracting a fundamental wave component of a voltage induced across a first winding; an oscillator for generating a clock signal having an oscillation frequency that changes according to a change in the fundamental wave component; and a control circuit for (i) generating a control signal for controlling a switching element to be in an ON state or OFF state, the switching signal having a duty that changes according to a change in the oscillation frequency of the clock signal or a change in a voltage of a smoothing capacitor and (ii) supplying the control signal to a gate of the switching element.

1 Claim, 5 Drawing Sheets

US 8,743,576 B2

BOOST TYPE SWITCHING POWER SUPPLY DEVICE INCLUDING POWER FACTOR IMPROVEMENT CIRCUIT

This Nonprovisional application claims priority under 35 U.S.C. §119(a) on Patent Application No. 2010-214505 filed in Japan on Sep. 24, 2010, the entire contents of which are hereby incorporated by reference.

TECHNICAL FIELD

The present invention relates to a boost type switching power supply device including a power factor improvement circuit.

BACKGROUND ART

According to a switching power supply device in which an alternating voltage from an AC source is converted into a direct voltage by a rectifier and a first smoothing capacitor, a waveform of an electric current supplied to the switching power supply device is distorted. This causes a reduction in a power factor.

In view of this, a conventional switching power supply device includes a circuit which suppresses the distortion of the waveform of the electric current supplied to the switching power supply device. In such a circuit, a boost chopper circuit is connected with an output terminal of the rectifier. The boost chopper circuit is constituted by a boost inductor, a switching element, a rectifier diode, and a second smoothing capacitor. Such a circuit is called a power factor improvement circuit because the circuit improves a power factor by suppressing a distortion of a current waveform.

There have been two methods for controlling the power factor improvement circuit. A first method is a DCM (Discontinuous Conduction Mode). According to the DCM, the switching element is caused to be in an ON state for a certain period of time so that an electric current passes through the boost inductor. When the switching element goes into an OFF state, a state in which no electric current is passing through the boost inductor is detected, and the switching element is again caused to be in the ON state. A second method is a CCM (Continuous Conduction Mode). According to the CCM, a PWM (Pulse Width Modulation) control is carried out at predetermined intervals regardless of the electric current passing through the boost inductor.

FIG. 5, which corresponds to FIG. 1 of Patent Literature 1, is a circuit diagram illustrating a conventional switching power supply device 101 including a power factor improvement circuit. The power factor improvement circuit of FIG. 5 employs the CCM. The switching power supply device 101 of FIG. 5 includes (i) a filter 111 which filters out noise contained in an AC input voltage Vin and (ii) a bridge rectifier circuit DB which rectifies the AC input voltage Vin supplied via the filter 111. The switching power supply device 101 further includes a smoothing capacitor C101 which smoothes a rectified voltage supplied from the bridge rectifier circuit DB.

The smoothing capacitor C101 is connected, at its both terminals, with a first series circuit which includes a boost inductor L101, a switching element Q101, and a resistor R104. The switching element Q101 is for example a MOSFET (Metal Oxide Semiconductor Field Effect Transistor). Between a drain and a source of the switching element Q101, a second series circuit, which includes a rectifier diode D101 and a smoothing capacitor C104, is connected. The smoothing capacitor C104 is connected, at its both terminals, with a third series circuit which includes a resistor R108 and a resistor R109.

According to the conventional switching power supply device 101 which includes the power factor improvement circuit employing the CCM, in a case where electric power greater than or equal to a certain value is supplied to a load, a direct current is superimposed on an electric current passing through the boost inductor L101. Accordingly, an electric current constantly passes through the boost inductor L101.

Note here that the electric power greater than or equal to a certain value depends on (i) inductance of the boost inductor L101, (ii) a period during which the switching element Q101 is in the ON state, (iii) a voltage applied to the boost inductor L101, and the like.

When the direct current is superimposed on the electric current passing through the boost inductor L101, the switching element Q101 goes into the ON state while an electric current is flowing from the boost inductor L101 to the rectifier diode D101. This causes a state of the rectifier diode D101 to abruptly change from an ON state to a state in which a voltage in an opposite direction is applied across the rectifier diode D101. That is, after the switching element Q101 goes into the ON state, a recovery current passes through the rectifier diode D101 from a cathode to an anode.

The recovery current is a pulsed current which flows for a short period of time. However, the recovery current is larger than an electric current passing through the rectifier diode D101 while the rectifier diode D101 is being in the ON state. Therefore, the recovery current causes noise. In order to suppress noise, generally, a snubber circuit is provided so as to be connected in parallel with the rectifier diode D101.

The conventional power factor improvement circuit of FIG. 5 includes a fundamental wave component extraction circuit 118 provided between (i) a gate of the switching element Q101 and an output terminal of an AND circuit 127 and (ii) a resistor RT (timing resistor) of an oscillator 119.

The fundamental wave component extraction circuit 118 includes (i) a resistor R110 and a resistor R111 which are connected in series with each other and (ii) a capacitor C105. The capacitor C105 has (a) a first terminal which is connected to a connection point between the resistor R110 and the resistor R111 and (b) a second terminal which is electrically grounded.

The oscillator 119 is capable of changing an oscillation frequency by a control signal G supplied from the fundamental wave component extraction circuit 118, which control signal G is a fundamental wave component of a control signal F supplied to the gate of the switching element Q101. As the oscillation frequency of the oscillator 119 changes according to a change in the control signal G, a frequency (i.e., duty) of the control signal F (a PWM signal) changes.

As the frequency of the control signal F (the PWM signal) changes like above, frequencies of harmonic components of the control signal F are dispersed. As the frequencies of the harmonic components are dispersed, frequencies of noise caused by the recovery current are also dispersed. Accordingly, superimposition of noise at an identical frequency does not occur, and thus the noise can be reduced (that is, it is possible to further reduce a level of noise, refer to Patent Literature 1).

According to the switching power supply device 101 of FIG. 5, the bridge rectifier circuit DB rectifies the AC input voltage Vin via the filter 111 which serves as a noise filter. A rectified voltage outputted from the bridge rectifier circuit DB is then supplied to the boost chopper circuit via the smoothing capacitor C101 (normal mode filter).

The boost chopper circuit includes the boost inductor L101, the switching element Q101 which is for example an MOSFET, the rectifier diode D101, and the smoothing capacitor C104. The boost chopper circuit causes the switching element Q101 to go into the ON state or OFF state in response to the control signal F supplied from the AND circuit 127 of a control circuit section. Thereby, a boosted output voltage Vo is applied to both terminals of the smoothing capacitor C104.

The control circuit section includes a voltage sense operational amplifier 113, a multiplier 115, a current sense operational amplifier 117, the oscillator (OSC) 119, a PWM comparator 123, an inverter (INV) 121, an RS flip-flop circuit 125, and the AND circuit 127. The control circuit section is configured so as to supply the control signal F from the AND circuit 127 to the switching element Q101.

The boost chopper circuit and the control circuit section constitute a boost-chopper type active filter circuit. The active filter circuit carries out a PWM control such that a switching frequency of the switching element Q101 is fixed. Under such circumstances, in a case where input and output satisfy a predetermined condition, a direct current is superimposed on an electric current passing through the boost inductor L101. Such an active filter circuit is called a current continuous type active filter circuit.

The active filter circuit detects a waveform of an input voltage so as to cause an input current to be a sine wave similar to that of the input voltage. The waveform thus detected serves as a target value of a waveform of the input current which is the sine wave.

According to the example of FIG. 5, an input voltage from the smoothing capacitor C101 is divided by the resistor R101 and the resistor R102 which are connected in series with each other. The multiplier 115 receives a divided voltage via its input terminal C.

The output voltage Vo is divided by the resistor R108 and the resistor R109. The voltage sense operational amplifier 113 amplifies an error voltage between one of divided output voltages Vo and a reference voltage Vref. An amplified error voltage is supplied to an input terminal D of the multiplier 115 via a phase compensation circuit including the capacitor C106, the capacitor C107, and the resistor R107.

The multiplier 115 of FIG. 5 is a current output type multiplier. The multiplier 115 multiplies the amplified error voltage, which is supplied from the voltage detection operation amplifier 113, by a voltage supplied from a connection point between the resistor R101 and the resistor R102. The multiplier 115 then supplies an output signal E to an inverting input terminal (−) of the current sense operational amplifier 117. That is, the multiplier 115 determines a magnitude of a target sine wave current in accordance with a level of an error signal of the output voltage Vo (that is, in accordance with to what degree the output voltage Vo is different from the rectified voltage supplied from the bridge rectifier circuit DB).

The current sense operational amplifier 117 (i) compares the output signal E (a target value of a switching current) with the switching current detected by the resistor R104 (current sensing resistor) and (ii) amplifies an obtained result so as to obtain an output signal J, and then (iii) supplies the output signal J to an inverting input terminal (−) of the PWM comparator 123.

A capacitor CT is connected between the oscillator 119 and ground (GND). Similarly, the resistor RT is connected between the oscillator 119 and the ground (GND). The oscillation frequency of the oscillator 119 depends on a capacitance of the capacitor CT and a resistance of the resistor RT. The switching frequency of the switching element Q101 depends on the oscillation frequency of the oscillator 119.

The oscillator 119 repeats charging the capacitor CT and discharging electric charge stored in the capacitor CT, thereby generating a triangular wave signal A as illustrated in a timing chart of FIG. 6. Meanwhile, the oscillator 119 generates a square wave signal B on the basis of maximum and minimum values of the triangular wave signal A.

The triangular wave signal A is supplied to a non-inverting input terminal (+) of the PWM comparator 123. The square wave signal B is supplied to a reset terminal R of the RS flip-flop circuit 125 and an input terminal of the inverter 121.

The PWM comparator 123 supplies an H-level signal to a set terminal S of the RS flip-flop circuit 125 in a case where the triangular wave signal A from the oscillator 119 is equal to or larger than the output signal J from the current sense operational amplifier 117. On the other hand, the PWM comparator 123 supplies an L-level signal to the set terminal S of the RS flip-flop circuit 125 in a case where the triangular wave signal A from the oscillator 119 is smaller than the output signal J from the current sense operational amplifier 117.

The RS flip-flop circuit 125 outputs an H-level signal via its output terminal Q in response to the H-level signal received from the PWM comparator 123 via the set terminal S. The H-level signal thus outputted is supplied to a first input terminal of the AND circuit 127. On the other hand, the RS flip-flop circuit 125 is reset in response to the square wave signal B received from the oscillator 119 via the reset terminal R, and outputs an L-level signal via its output terminal Q. The L-level signal thus outputted is supplied to the first input terminal of the AND circuit 127.

The inverter 121 inverts the square wave signal B. An inverted square wave signal B (CLK with an overbar) is supplied to a second input terminal of the AND circuit 127.

The AND circuit 127 calculates AND of (i) the H-level or L-level signal supplied from the RS flip-flop circuit 125 via the output terminal Q and (ii) the inverted square wave signal B supplied from the inverter 121 so as to obtain a signal. The signal thus obtained, which signal serves as the control signal F, is supplied to the gate of the switching element Q101.

FIG. 6 illustrates a waveform of the control signal F. According to FIG. 6, the control signal F is in the H level during a period from a time t11 through a time t12 and a period from a time t14 through a time t15. Each of the time t11 and the time t14 is a time from which a level of the triangular wave signal A starts becoming higher than that of the output signal J. Each of the time t12 and the time t15 is a time from which a level of the square wave signal B starts changing from the L level to H level. This indicates that the square wave signal B in the H level is indicative of a start of a dead time during which the switching element Q101 is definitely in an OFF state.

According to the example of FIG. 6, a level of the output signal J from the current sense operational amplifier 117 increases as time passes. Along with this, a period during which the level of the control signal F, which is supplied to the gate of the switching element Q101, is being in the H level becomes shorter as time passes. Accordingly, the output voltage Vo becomes substantially constant as time passes. At the same time, a waveform of an electric current supplied to the switching power supply device 101 is controlled to be substantially a sine wave. This improves a power factor.

The fundamental wave component extraction circuit 118 includes the resistor R110 and the resistor R111, which are connected in series with each other between (i) the output terminal (i.e., the gate of the switching element Q101) of the AND circuit 127 and (ii) a connection point of the oscillator 119 and the resistor RT. The fundamental wave component extraction circuit 118 further includes the capacitor C105, which has the first terminal connected with the connection point of the resistor R110 and the resistor R111 and the second terminal electrically grounded.

The fundamental wave component extraction circuit 118 extracts the fundamental wave component of the control signal F for controlling the switching element Q101 through a CR filter constituted by the resistor R111 and the capacitor C105. The fundamental wave component extraction circuit 118 then supplies the control signal G, which is the fundamental wave component of the control signal F, to the resistor RT of the oscillator 119. Such extraction of the fundamental wave component of the control signal F is referred to as averaging.

FIG. 7, showing how the fundamental wave component extraction circuit 118 operates, is a timing chart illustrating signals from various sections. The following description discusses, with reference to FIG. 7, how the fundamental wave component extraction circuit 118 operates.

First, a rectified voltage is divided in the switching power supply device 101 of FIG. 5 for the purpose of causing an electric current, which is to be supplied to the switching power supply device 101, to be a sine wave. Specifically, the AC input voltage Vin supplied to the rectifier circuit DB via the filter 111 is rectified so as to be the rectified voltage, and then the rectified voltage is divided by the resistor R101 and the resistor R102. One of thus divided voltages is supplied to the input terminal C of the multiplier 115. Upon reception of the voltage, the control circuit section generates the control signal F for controlling the switching element Q101. That is, the control signal F contains a frequency component (i.e., sine wave component) of a commercial frequency of the AC input voltage Vin.

The fundamental wave component extraction circuit 118 extracts the fundamental wave component of the control signal F, thereby obtaining a voltage C105v of the capacitor C105 (see FIG. 7).

The voltage C105v of the capacitor C105 is applied to the resistor RT of the oscillator 119 via the resistor R110, which is a resistor for level adjustment. Thereby, the voltage C105v applied to the resistor RT changes as shown in FIG. 7. This makes it possible to cause the oscillation frequency of the oscillator 119 to change according to a change in the sine wave component of the commercial frequency. That is, it is possible to modulate a frequency in accordance with the sine wave component of the commercial frequency.

As a result, the switching frequency of the switching element Q101 changes within a certain range, and thus frequency components of a signal (PWM signal) supplied from the switching element Q101 are dispersed within a certain range. Accordingly, frequency components of noise, which is returned to an input terminal of the switching element Q101, are dispersed within a certain range according to the switching frequency. As a result, noise (voltage noise) having a frequency exists independently of other noise having another frequency. This prevents superimposition of noise, thereby reducing a voltage level of noise.

Note here that the noise returned to the input terminal of the switching element Q101 is noise caused by the recovery current.

Patent Literature 2 discloses a technique of reducing noise caused by switching like the switching power supply device 101 of FIG. 5, i.e., a DC-DC converter which reduces, at low cost, noise caused by a high-frequency component contained in a switching control signal.

CITATION LIST

Patent Literatures

Patent Literature 1
Japanese Patent Application Publication, Tokukai, No. 2009-177954 A (Publication Date: Aug. 6, 2009)
Patent Literature 2
Japanese Patent No. 3456583 B (Grant Date: Aug. 1, 2003)

SUMMARY OF INVENTION

Technical Problem

In order to reduce noise that occurs in a power factor improvement circuit which operates in the CCM, a snubber circuit can be connected in parallel with the rectifier diode D101. This is a simple and effective method of noise reduction.

Note, however, that the snubber circuit is a circuit that converts energy (i.e., electric power) into heat, which energy is a cause of noise. The more heat the snubber circuit generates, the more electric power is wasted. This will lead to a reduction in power efficiency.

In this regard, the power factor improvement circuit of FIG. 5 is capable of reducing noise without reducing power efficiency, because it includes no snubber circuit. Note here that a duty, which is a ratio of a pulse width of the output voltage Vo to a frequency of the output voltage Vo, is represented by the following equation:

Equation 1

$$\text{Duty} = \frac{V_0 - \sqrt{2} * V_{in}\sin(2*\pi*f*t)}{V_0} \quad (1)$$

where, Vin is an effective value of the AC input voltage, Vo is the output voltage, and f is a frequency of the AC input voltage.

According to Equation 1, the duty reaches its maximum when a phase of the AC input voltage is a multiple of 180 degrees. Assume that (i) the effective value (Vin of Equation 1) of the AC input voltage is small and (ii) the phase of the AC input voltage is close to the multiple of 180 degrees. In this case, if the duty is limited at a maximum duty (e.g., 90% through 94%) of IC so as to become constant, an output voltage from the fundamental wave component extraction circuit 118 becomes constant. This causes the oscillation frequency of the oscillator 119 and the switching frequency of the switching element Q101 to be fixed. As a result, frequencies of noise caused by switching are not dispersed, thereby causing superimposition of noise.

Further, the DC-DC converter of Patent Literature 2 has the following problem. According to FIG. 1 of Patent Literature 2, high-voltage line patterns need to be extended to an additional component 19 constituted by diodes 16 and 17 and a resister 18. Therefore, the diodes 16 and 17 and the resistor 18 of the additional component 19 need to have a markedly large creepage distance from adjacent wires so as to satisfy the safety standards. This places restrictions on the circuit implementation.

The DC-DC converter of Patent Literature 2 further has the following problem. That is, since the DC-DC converter additionally includes the resistor 18, the DC-DC converter constantly suffers from input loss (power loss) due to the resistor

18. For example, recently, electric power saving has been required. In view of this, assume that a power factor improvement converter stops being operated for the purpose of suppressing electric power consumption to a maximum extent for example when the DC-DC converter outputs a voltage to a light load. Even in such a case, it is not possible to reduce power consumption because of the constant input loss due to the resistor 18.

The present invention has been made in view of the problem, and an object of the present invention is to provide a switching power supply device capable of reducing, at low cost, noise components of a switching frequency and harmonics of the switching frequency.

Solution to Problem

In order to attain the above object, a switching power supply device in accordance with the present invention includes: a rectifier circuit for obtaining a rectified voltage by full-wave rectification of a sine wave voltage from an AC source; a first smoothing capacitor for obtaining a ripple current output voltage by smoothing the rectified voltage, the first smoothing capacitor having a first terminal connected with a first output terminal of the rectifier circuit and a second terminal connected with a second output terminal of the rectifier circuit; a first series circuit constituted by connecting in series (i) an inductor including a plurality of windings, (ii) a switching element, and (iii) a current sensing resistor, the inductor having a first terminal connected with the first terminal of the first smoothing capacitor and a second terminal connected with a drain of the switching element, the switching element having a source connected with a first terminal of the current sensing resistor, the current sensing resistor having a second terminal connected with the second terminal of the first smoothing capacitor, the inductor receiving the ripple current output voltage via its first terminal; a second series circuit constituted by connecting in series a rectifier diode and a second smoothing capacitor, the rectifier diode having an anode connected with the drain of the switching element and a cathode connected with a first terminal of the second smoothing capacitor, the second smoothing capacitor having a second terminal connected with the source of the switching element; a fundamental wave component extraction circuit for extracting a fundamental wave component of a voltage induced across any one of the plurality of windings; an oscillation circuit for generating a clock signal having an oscillation frequency that changes according to a change in the fundamental wave component; and a control circuit for (a) generating a control signal for controlling the switching element to be in an ON state or OFF state, the control signal having a duty that changes according to a change in the oscillation frequency of the clock signal or a change in a voltage of the second smoothing capacitor and (b) supplying the control signal to a gate of the switching element.

The switching power supply device employs a CCM (Continuous Conduction Mode), in which a PWM (Pulse Width Modulation) is carried out at predetermined intervals.

According to the switching power supply device employing the CCM, in a case where electric power greater than or equal to a certain value is supplied to a load, a direct current is superimposed on an electric current passing through the inductor. Accordingly, an electric current constantly passes through the inductor.

Note here that the electric power greater than or equal to a certain value depends on (i) inductance of the inductor, (ii) a period during which the switching element is in an ON state, (iii) a voltage applied to the first terminal of the inductor, and the like.

When the direct current is superimposed on the electric current passing through the inductor, the switching element goes into the ON state while an electric current is flowing from the inductor to the rectifier diode. This causes a state of the rectifier diode to abruptly change from an ON state to a state in which a voltage in an opposite direction is applied across the rectifier diode. That is, after the switching element goes into the ON state, a recovery current passes through the rectifier diode from the cathode to the anode.

The recovery current is a pulsed current which flows for a short period of time. However, the recovery current is far larger than an electric current passing through the rectifier diode while the rectifier diode is being in the ON state. Therefore, the recovery current causes noise.

The switching power supply device includes the fundamental wave component extraction circuit. The oscillation circuit is capable of changing the oscillation frequency according to a change in the fundamental wave component contained in a signal supplied from the fundamental wave component extraction circuit. As the oscillation frequency of the oscillation circuit changes according to the change in the fundamental wave component, a frequency (i.e., duty) of a control signal F (PWM signal) supplied to the gate of the switching element changes.

As the frequency of the control signal (PWM signal) changes like above, frequencies of harmonic components of the control signal are dispersed. As the frequencies of the harmonic components are dispersed, frequencies of noise caused by the recovery current are also dispersed. Accordingly, superimposition of noise at an identical frequency does not occur, and thus the noise can be reduced (that is, it is possible to further reduce a level of noise).

Note here that, according to the switching power supply device, the fundamental wave component extraction circuit extracts the fundamental wave component of the voltage induced across any one of the plurality of windings, and supplies the fundamental wave component to the oscillation circuit. Therefore, it is possible to change the oscillation frequency according to the change in the fundamental wave component regardless of the change in the duty of the control signal. Accordingly, it is possible to solve a problem of a power factor improvement circuit of a conventional switching power supply device. That is, it is possible to prevent a situation in which superimposition of noise occurs because the duty is limited and thus the oscillation frequency is fixed.

Further, since the switching power supply device includes no snubber circuit, it is possible to reduce noise at low cost without reducing power efficiency.

As such, it is possible to provide a switching power supply device capable of reducing, at low cost, noise components at a switching frequency and harmonics of the switching frequency.

Advantageous Effects of Invention

As so far described, a switching power supply device in accordance with the present invention includes: a rectifier circuit for obtaining a rectified voltage by full-wave rectification of a sine wave voltage from an AC source; a first smoothing capacitor for obtaining a ripple current output voltage by smoothing the rectified voltage, the first smoothing capacitor having a first terminal connected with a first output terminal of the rectifier circuit and a second terminal connected with a second output terminal of the rectifier circuit; a first series circuit constituted by connecting in series (i) an inductor including a plurality of windings, (ii) a switching element, and (iii) a current sensing resistor, the inductor having a first terminal connected with the first terminal of the first smoothing capacitor and a second terminal connected with a drain of the switching element, the switching element having a source connected with a first terminal of the current sensing resistor, the current sensing resistor having a second terminal connected with the second terminal of the first smoothing capacitor, the inductor receiving the ripple current output voltage via its first terminal; a second series circuit constituted by connecting in series a rectifier diode and a second smoothing capacitor, the rectifier diode having an anode connected with the drain of the switching element and a cathode connected with a first terminal of the second smoothing capacitor, the second smoothing capacitor having a second terminal connected with the source of the switching element; a fundamental wave component extraction circuit for extracting a fundamental wave component of a voltage induced across any one of the plurality of windings; an oscillation circuit for generating a clock signal having an oscillation frequency that changes according to a change in the fundamental wave component; and a control circuit for (a) generating a control signal for controlling the switching element to be in an ON state or OFF state, the control signal having a duty that changes according to a change in the oscillation frequency of the clock signal or a change in a voltage of the second smoothing capacitor and (b) supplying the control signal to a gate of the switching element.

As such, it is possible to provide a switching power supply device capable of reducing, at low cost, noise components at a switching frequency and harmonics of the switching frequency.

DESCRIPTION OF EMBODIMENTS

The following description discusses one embodiment of the present invention with reference to FIGS. 1 through 4 and FIG. 6.
[Switching Power Supply Device 1]

Figure 1:
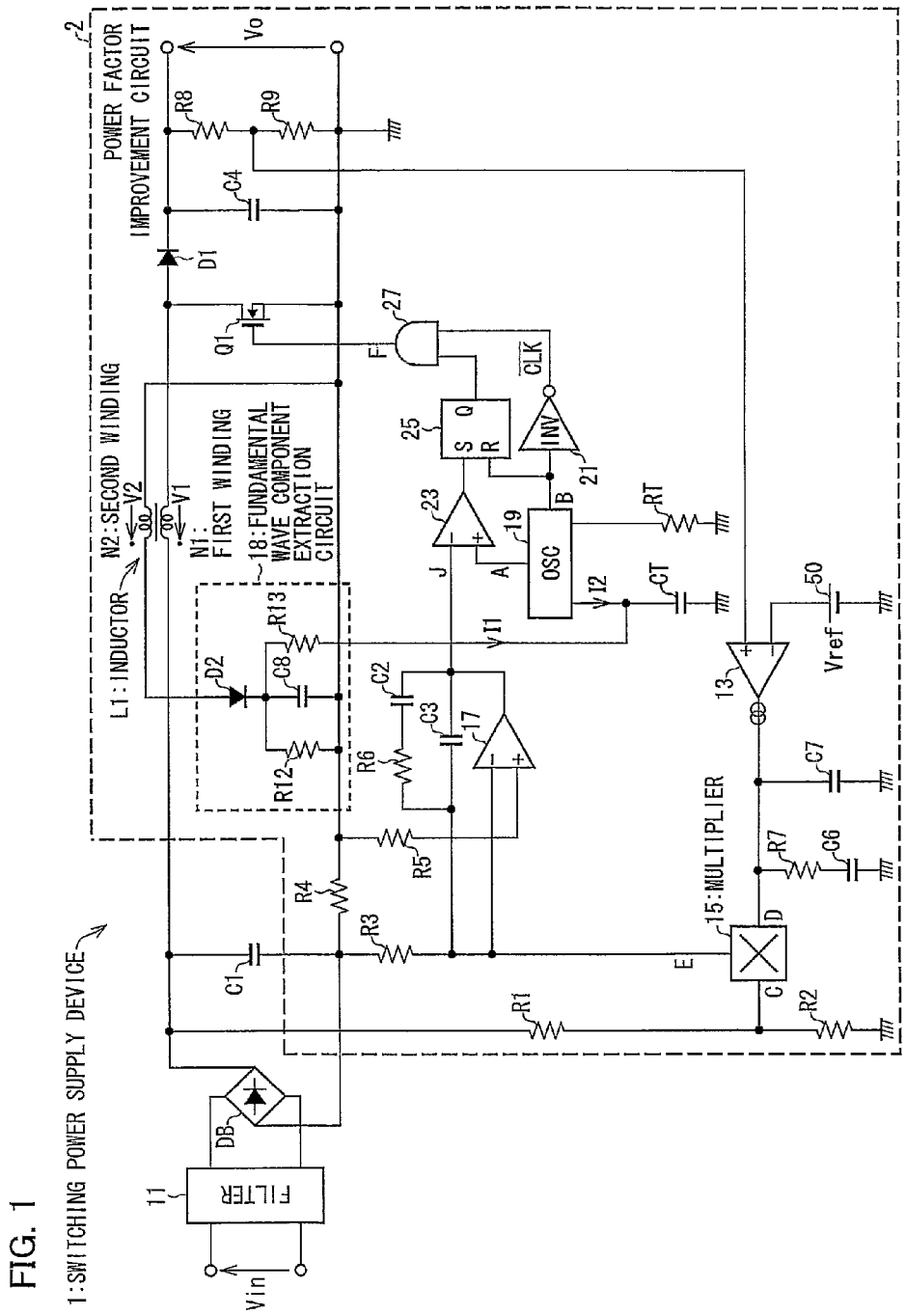
FIG. 1 is a circuit diagram illustrating a switching power supply device of one embodiment in accordance with the present invention.

FIG. 1 is a circuit diagram illustrating a switching power supply device 1 of the present embodiment. The switching power supply device 1 of FIG. 1 includes (i) a filter 11 which filters out noise contained in an AC input voltage Vin (sine wave voltage) supplied from an AC source and (ii) a bridge rectifier circuit DB (rectifier circuit) which carries out full-wave rectification of the AC input voltage Vin supplied via the filter 11. The switching power supply device 1 further includes (iii) a smoothing capacitor C1 (first smoothing capacitor) which smoothens a rectified voltage supplied from the bridge rectifier circuit DB so as to obtain a ripple current output voltage and (iv) a power factor improvement circuit (power factor improvement converter) 2.

The smoothing capacitor C1 is connected, at its both terminals, with a first series circuit which includes (i) a first winding N1 of an inductor L1 that has a plurality of windings, (ii) a switching element Q1, and (iii) a resistor R4. The switching element Q1 is for example a MOSFET (Metal Oxide Semiconductor Field Effect Transistor). A second series circuit, which includes a rectifier diode D1 and a smoothing capacitor C4, is connected with a drain and a source of the switching element Q1. The smoothing capacitor C4 is connected, at its both terminals, with a third series circuit including a resistor R8 and a resistor R9.

The power factor improvement circuit 2 includes a fundamental wave component extraction circuit 18, the first winding N1, a second winding N2, the switching element Q1, the rectifier diode D1, the smoothing capacitor C4 (second smoothing capacitor), a resistor R1, a resistor R2, a resistor R3, the resistor R4, a resistor R5, a resistor R6, a resistor R7, a resistor R8, the resistor R9, a resistor RT, a capacitor C2, a capacitor C3, a capacitor C6, a capacitor C7, and a capacitor CT. The power factor improvement circuit 2 further includes a voltage sense operational amplifier 13, a reference voltage supply 50, a multiplier 15, a current sense operational amplifier 17, an oscillator 19 (oscillating circuit), a PWM comparator 23, an inverter (INV) 21, an RS flip-flop circuit 25, and an AND circuit 27. The fundamental wave component extraction circuit 18 is constituted by a diode D2, a resistor R12, a resistor R13, and a capacitor C8. The first winding N1 and the second winding N2 are magnetically connected with each other so as to constitute the inductor L1.

In the switching power supply device 1, the AC input voltage Vin is supplied to an input terminal of the filter 11. An output terminal of the filter 11 is connected with an input terminal of the bridge rectifier circuit DB. The bridge rectifier circuit DB has a first output terminal which is connected with (i) a first terminal of the resistor R1, (ii) a first terminal of the smoothing capacitor C1, and (iii) a first terminal of the first winding N1. A second terminal of the first winding N1 is connected with an anode of the rectifier diode D1 and the drain of the switching element Q1.

A cathode of the rectifier diode D1 is connected with a first terminal of the smoothing capacitor C4 and a first terminal of the resistor R8. A second terminal of the resistor R8 is connected with a first terminal of the resistor R9 and a non-inverting input terminal (+) of the voltage sense operational amplifier 13.

An output terminal of the reference voltage supply 50 is connected with an inverting input terminal (−) of the voltage sense operational amplifier 13. An output terminal of the voltage sense operational amplifier 13 is connected with (i) a first terminal of the capacitor C7, (ii) a first terminal of the resistor R7, and an input terminal D of the multiplier 15. A second terminal of the resistor R7 is connected with a first terminal of the capacitor C6.

An input terminal C of the multiplier 15 is connected with a second terminal of the resistor R1 and a first terminal of the resistor R2. The multiplier 15 supplies an output signal E to (i) an inverting input terminal (−) of the current sense operational amplifier 17, (ii) a first terminal of the capacitor C3, (iii) a first terminal of the resistor R6, and (iv) a first terminal of the resistor R3. A second terminal of the resistor R3 is connected with (a) a second output terminal of the bridge rectifier circuit DB, (b) a second terminal of the smoothing capacitor C1, and (c) a second terminal of the resistor R4 (current sensing resistor).

A first terminal of the resistor R5 is connected with a non-inverting input terminal (+) of the current sense operational amplifier 17. A second terminal of the resistor R6 is connected with a first terminal of the capacitor C2. An output terminal of the current sense operational amplifier 17 is connected with (i) a second terminal of the capacitor C2, (ii) a second terminal of the capacitor C3, and (iii) an inverting input terminal (−) of the PWM comparator 23.

An anode of the diode D2 is connected with a first terminal of the second winding N2. A cathode of the diode D2 is connected with (i) a first terminal of the resistor R12 (first resistor), (ii) a first terminal of the capacitor C8, and (iii) a first terminal of the resistor R13 (second resistor). A second terminal of the resistor R13 is connected with a first terminal of the capacitor CT and a first input terminal of the oscillator 19. A first terminal of the resistor RT (timing resistor) is connected with a second input terminal of the oscillator 19.

A first output terminal of the oscillator 19 is connected with a non-inverting input terminal (+) of the PWM comparator 23. A second output terminal of the oscillator 19 is connected with an input terminal of the inverter 21 and a reset terminal R of the RS flip-flop circuit 25.

An output terminal of the PWM comparator 23 is connected with a set terminal S of the RS flip-flop circuit 25. An output terminal Q of the RS flip-flop circuit 25 is connected with a first input terminal of the AND circuit 27. An output terminal of the inverter 21 is connected with a second input terminal of the AND circuit 27. An output terminal of the AND terminal 27 is connected with a gate of the switching element Q1.

Further, a second terminal of the resistor R2, a second terminal of the capacitor C6, a second terminal of the capacitor C7, an input terminal of the reference voltage supply 50, a second terminal of the capacitor CT, a second terminal of the resistor RT, a first terminal of the resistor R4, a second terminal of the resistor R5, and a second terminal of the resistor R12 are electrically grounded. Moreover, a second terminal of the capacitor C8, a second terminal of the second winding N2, the source of the switching element Q1, a second terminal of the smoothing capacitor C4, and a second terminal of the resistor R9 are electrically grounded.

The power factor improvement circuit 2 of FIG. 1 operates in a CCM (Continuous Conduction Mode), and carries out a PWM (Pulse Width Modulation) control at predetermined intervals regardless of an electric current passing through the first winding N1 (boost inductor).

According to the switching power supply device 1 including the power factor improvement circuit 2 which operates in the CCM, the following occurs; that is, in a case where electric power greater than or equal to a certain value is supplied to a load, a direct current is superimposed on an electric current passing through the first winding N1. Accordingly, an electric current constantly passes through the first winding N1.

Note here that the electric power greater than or equal to a certain value depends on (i) self inductance of the first winding N1, (ii) a period during which the switching element Q1 is in an ON state, (iii) a voltage applied to the first terminal of the first winding N1, and the like.

When the direct current is superimposed on the electric current passing through the first winding N1, the switching element Q1 goes into the ON state while an electric current is flowing from the first winding N1 to the rectifier diode D1. This causes a state of the rectifier diode D1 to abruptly change from an ON state to a state in which a voltage in an opposite direction is applied across the rectifier diode D1. That is, after the switching element Q1 goes into the ON state, a recovery current passes through the rectifier diode D1 from a cathode to an anode.

The recovery current is a pulsed current which flows for a short period of time. However, the recovery current is far larger than an electric current passing through the rectifier diode D1 while the rectifier diode D1 is being in the ON state. Therefore, the recovery current causes noise.

The power factor improvement circuit 2 of FIG. 1 includes the fundamental wave component extraction circuit 18, which is connected between (i) the second winding N2 of the inductor L1 and (ii) the capacitor CT of the oscillator 19 (described later). The fundamental wave component extraction circuit 18 extracts a fundamental wave component of a voltage V1, which is induced across the first winding N1. The oscillator 19 is capable of changing an oscillation frequency of a clock signal that the oscillator 19 generates, according to a change in the fundamental wave component contained in a signal supplied from the fundamental wave component extraction circuit 18. Specifically, the oscillation frequency becomes high when the fundamental wave component is large, whereas the oscillation frequency becomes low when the fundamental wave component is small.

As the oscillation frequency of the oscillator 19 changes according to the change in the fundamental wave component, a frequency (i.e., duty) of a control signal F (PWM signal) supplied to the gate of the switching element Q1 changes. The duty of the control signal F changes according also to a change in a voltage (i.e., output voltage Vo) of the smoothing capacitor C4.

As the frequency of the control signal F (PWM signal) changes like above, frequencies of harmonic components of the control signal F are dispersed. As the frequencies of the harmonic components are dispersed, frequencies of noise caused by the recovery current are also dispersed. Accordingly, superimposition of noise at an identical frequency does not occur, and thus the noise can be reduced (suppressed) (that is, it is possible to further reduce a level of noise). The fundamental wave component extraction circuit 18 is described later in [Fundamental wave component extraction circuit 18].

According to the power factor improvement circuit 2 of FIG. 1, the fundamental wave component extraction circuit 18 extracts a fundamental wave component of the voltage V1 which is induced across the first winding N1, and then supplies the fundamental wave component to the oscillator 19. Therefore, it is possible to change the oscillation frequency according to the change in the fundamental wave component regardless of the change in the duty of the control signal F. Accordingly, it is possible to solve a problem of a power factor improvement circuit of a conventional switching power supply device. That is, it is possible to prevent a situation in which superimposition of noise occurs because the duty is limited and thus the oscillation frequency is fixed.

Further, since the power factor improvement circuit 2 of FIG. 1 includes no snubber circuit, it is possible to reduce noise at low cost without reducing power efficiency.

As such, it is possible to provide a switching power supply device 1 capable of reducing, at low cost, noise components at a switching frequency and harmonics of the switching frequency.

A duty, which is a ratio of a pulse width of the output voltage Vo to a frequency of the output voltage Vo, is represented by the following equation:

Equation 2

$$\text{Duty} = \frac{V_0 - \sqrt{2} * V_{in}\sin(2*\pi*f*t)}{V_0} \quad (2)$$

where, Vin is an effective value of the AC input voltage, Vo is the output voltage, and f is a frequency of the AC input voltage.

According to the switching power supply device 1 of FIG. 1, the bridge rectifier circuit DB rectifies the AC input voltage Vin via the filter 11 serving as a noise filter. The bridge rectifier circuit DB then supplies a rectified voltage to the boost chopper circuit via the smoothing capacitor C1 (normal mode filter).

The boost chopper circuit includes the first winding N1 of the inductor L1, the switching element Q1 which is for example a MOSFET, the rectifier diode D1, and the smoothing capacitor C4. The boost chopper circuit causes the switching element Q1 to go into the ON state or OFF state in response to the control signal F supplied from the AND circuit 27 of the control circuit section (control circuit, described later). Thereby, a boosted output voltage Vo is applied to both terminals of the smoothing capacitor C4.

The control circuit section includes the voltage sense operational amplifier 13, the reference voltage supply 50, the multiplier 15, the current sense operational amplifier 17, the oscillator (OSC) 19, the PWM comparator 23, the inverter (INV) 21, the RS flip-flop circuit 25, and the AND circuit 27. The control circuit section supplies the control signal F from the AND circuit 27 to the switching element Q1.

The boost chopper circuit and the control circuit section constitute the boost-chopper type active filter circuit. The active filter circuit carries out a PWM control such that the switching frequency of the switching element Q1 is fixed. Under such circumstances, in a case where input and output satisfy a certain condition, a direct current is superimposed on an electric current passing through the first winding N1. Such an active filter circuit is called a current continuous type active filter circuit.

The active filter circuit detects a waveform of the AC input voltage Vin so as to cause an input electric current, which is to be supplied to the switching power supply device 1, to be a sine wave similar to that of a voltage (AC input voltage Vin) to be applied to the switching power supply device 1. The waveform thus detected serves as a target value of the waveform of the input electric current which is the sine wave.

Assume that no active filter circuit is provided in the switching power supply device 1. In such a case, an input electric current to be supplied to the switching power supply device 1 flows only when the AC input voltage Vin is higher than a voltage of the smoothing capacitor C4. As a result, the waveform of the input electric current is no longer a sine wave (refer to FIG. 3).

According to the example of FIG. 1, the input voltage supplied from the smoothing capacitor C1 is divided by the resistor R1 and the resistor R2 which are connected in series with each other. The multiplier 15 receives a divided voltage via its input terminal C.

Further, the output voltage Vo is divided by the resistor R8 and the resistor R9. The voltage sense operational amplifier 13 amplifies an error voltage between one of divided output voltages Vo and the reference voltage Vref. An amplified error voltage is supplied to the input terminal D of the multiplier 15 via a phase compensation circuit constituted by the capacitor C6, the capacitor C7, and the resistor R7.

The multiplier 15 of FIG. 1 is a current output type multiplier. The multiplier 15 multiplies the amplified error voltage, which is supplied from the voltage sense operational amplifier 13, by a voltage supplied from a connection point between the resistor R1 and the resistor R2. The multiplier 15 then supplies the output signal E to the inverting input terminal (−) of the current sense operational amplifier 17. That is, the multiplier 15 determines a magnitude of a target sine wave current in accordance with a level of an error signal of the output voltage Vo (that is, in accordance with to what degree the output voltage Vo is different from the rectified voltage supplied from the bridge rectifier circuit DB).

The current sense operational amplifier 17 (i) compares the output signal E (a target value of the switching current) with the switching current detected by the resistor R4 (current sensing resistor) and (ii) amplifies an obtained result so as to obtain an output signal J, and then (iii) supplies the output signal J to the inverting input terminal (−) of the PWM comparator 23.

The capacitor CT is connected between the oscillator 19 and the ground (GND). Similarly, the resistor RT is connected between the oscillator 19 and the ground (GND). The oscillation frequency of the oscillator 119 depends on a capacitance of the capacitor CT and a resistance of the resistor RT. The switching frequency of the switching element Q1 depends on the oscillation frequency of the oscillator 19.

Figure 6:
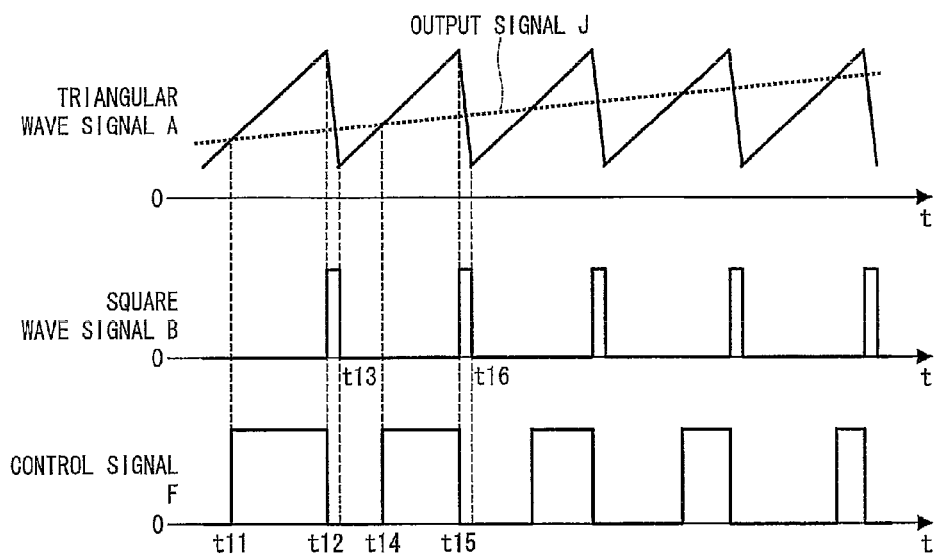
FIG. 6 is a timing chart illustrating various signals in a switching power supply device.
Figure 7:
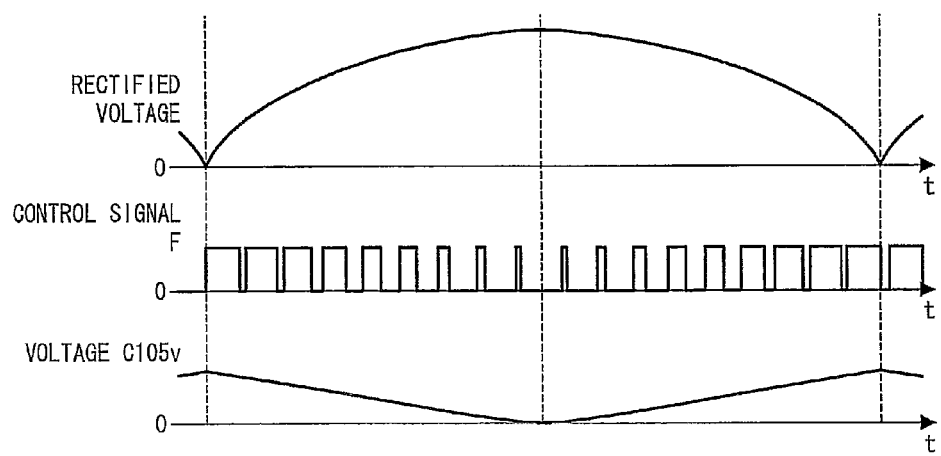
FIG. 7, showing how a fundamental wave component extraction circuit operates, is a timing chart illustrating signals from various sections.

The oscillator 19 repeats charging the capacitor CT and discharging electric charge stored in the capacitor CT, thereby generating a triangular wave signal A as illustrated in a timing chart of FIG. 6. Meanwhile, the oscillator 19 generates a square wave signal B on the basis of maximum and minimum values of the triangular wave signal A.

The triangular wave signal A is supplied to a non-inverting input terminal (+) of the PWM comparator 23. The square wave signal B is supplied to the reset terminal R of the RS flip-flop circuit 25 and to the input terminal of the inverter 21.

The PWM comparator 23 supplies an H-level signal to the set terminal S of the RS flip-flop circuit 25 in a case where the triangular wave signal A from the oscillator 19 is equal to or larger than the output signal J from the current sense operational amplifier 17. On the other hand, the PWM comparator 23 supplies an L-level signal to the set terminal S of the RS flip-flop circuit 25 in a case where the triangular wave signal A from the oscillator 19 is smaller than the output signal J from the current sense operational amplifier 17.

The RS flip-flop circuit 25 outputs an H-level signal via its output terminal Q in response to the H-level signal received from the PWM comparator 23 via the set terminal S. The H-level signal thus outputted is supplied to the first input terminal of the AND circuit 27. On the other hand, the RS flip-flop circuit 25 is reset in response to the square wave signal B received from the oscillator 19 via the reset terminal R, and outputs an L-level signal via its output terminal Q. The L-level signal thus outputted is supplied to the first input terminal of the AND circuit 27.

The inverter 21 inverts the square wave signal B. An inverted square wave signal B (CLK with an overbar) is supplied to the second input terminal of the AND circuit 27.

The AND circuit 27 calculates AND of (i) the H-level or L-level signal supplied from the RS flip-flop circuit 25 via the output terminal Q and (ii) the inverted square wave signal B supplied from the inverter 21 so as to obtain a signal. The signal thus obtained, which signal serves as the control signal F, is supplied to the gate of the switching element Q1.

FIG. 6 illustrates a waveform of the control signal F. According to FIG. 6, the control signal F is in the H level during a period from a time t11 through a time t12 and a period from a time t14 through a time t15. Each of the time t11 and the time t14 is a time from which a level of the triangular wave signal A starts becoming higher than that of the output signal J. Each of the time t12 and the time t15 is a time from which a level of the square wave signal B starts changing from the L level to H level. This indicates that the square wave signal B in the H level is indicative of a start of a dead time during which the switching element Q1 is definitely in an OFF state.

According to the example of FIG. 6, a level of the output signal J from the current sense operational amplifier 17 increases as time passes. Along with this, a period during which the level of the control signal F, which is supplied to the gate of the switching element Q1, is being in the H level becomes shorter as time passes. Accordingly, the output voltage Vo becomes substantially constant as time passes. At the same time, a waveform of an electric current supplied to the switching power supply device 1 is controlled to be substantially a sine wave. This improves a power factor.

Figure 4:
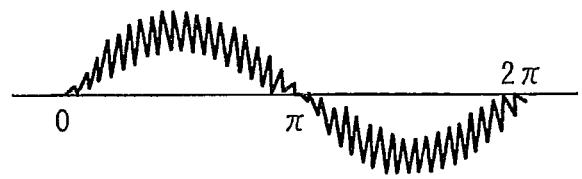
FIG. 4 is a waveform chart illustrating how an electric current passes through a first winding.
Figure 5:
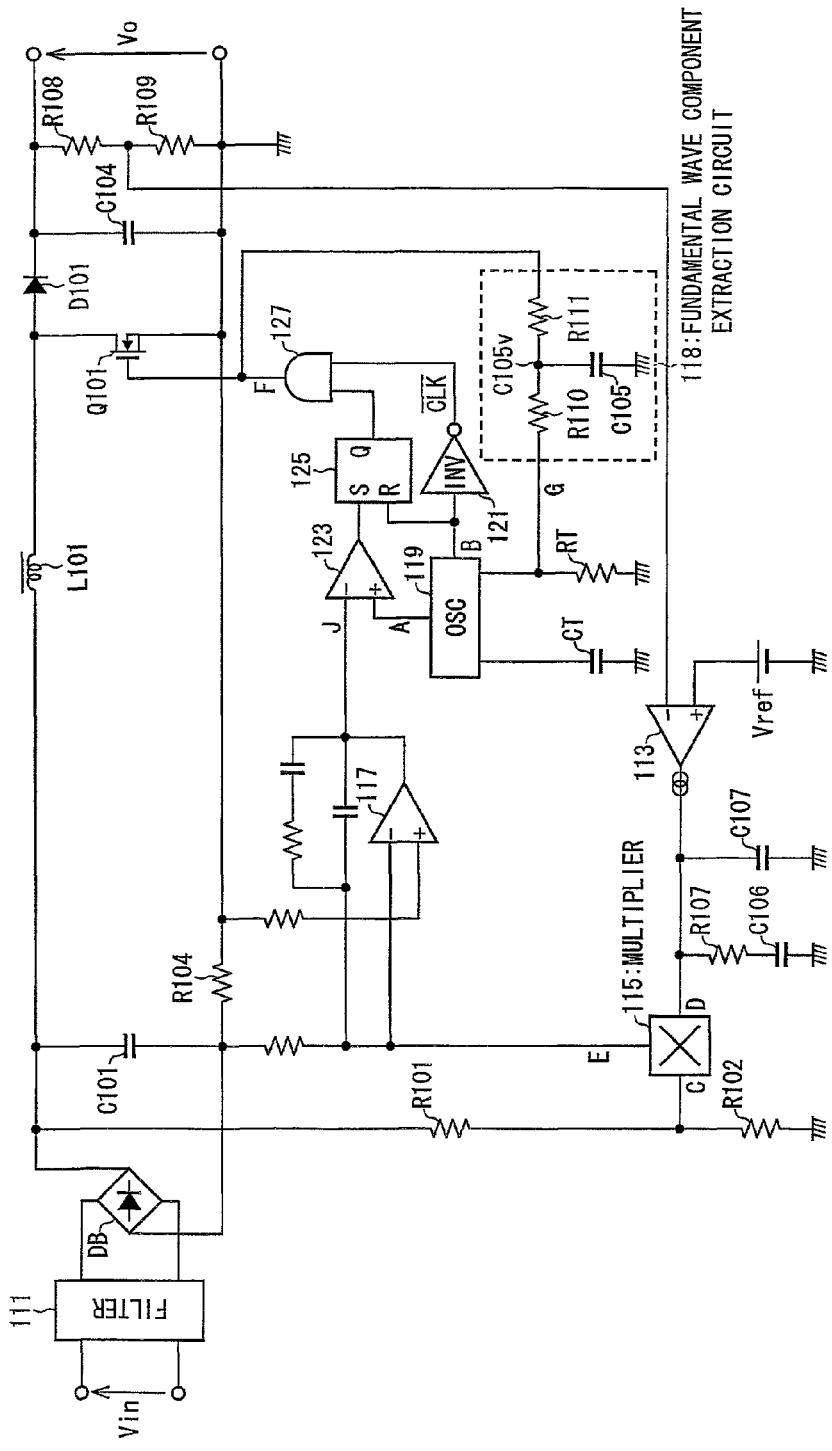
FIG. 5 is a circuit diagram illustrating a conventional switching power supply device including a power factor improvement circuit.

The following description discusses, with reference to FIG. 4, how the level of the output signal J increases as time passes. Since the power factor improvement circuit 2 of FIG. 1 is a continuous mode active filter circuit, an electric current of the first winding N1 is not zero while the switching element Q1 is being in the ON state. Specifically, an electric current passing through the first winding N1 decreases while the switching element Q1 is being in the OFF state. Then, at a time when the switching element Q1 goes into the ON state, the electric current starts increasing from a level as of this time. FIG. 4 illustrates a waveform chart showing the electric current passing through the first winding N1.

[Fundamental Wave Component Extraction Circuit 18]

In the fundamental wave component extraction circuit 18, the first winding N1 and the second winding N2 are magnetically connected with each other so as to constitute the inductor L1. The number of turns of the second winding N2 is smaller than that of the first winding N1. Therefore, in a case where a voltage V1 is induced across the first winding N1 so that the first terminal (indicated by ● (filled circle) of FIG. 1) of the first winding N1 is positive, a voltage V2, which is (N2/N1) times the voltage V1, is induced across the second winding N2. Note here that the voltage V2 is induced across the second winding N2 so that the first terminal (indicated by ● (filled circle) of FIG. 1) of the second winding N2 is positive.

Figure 2:
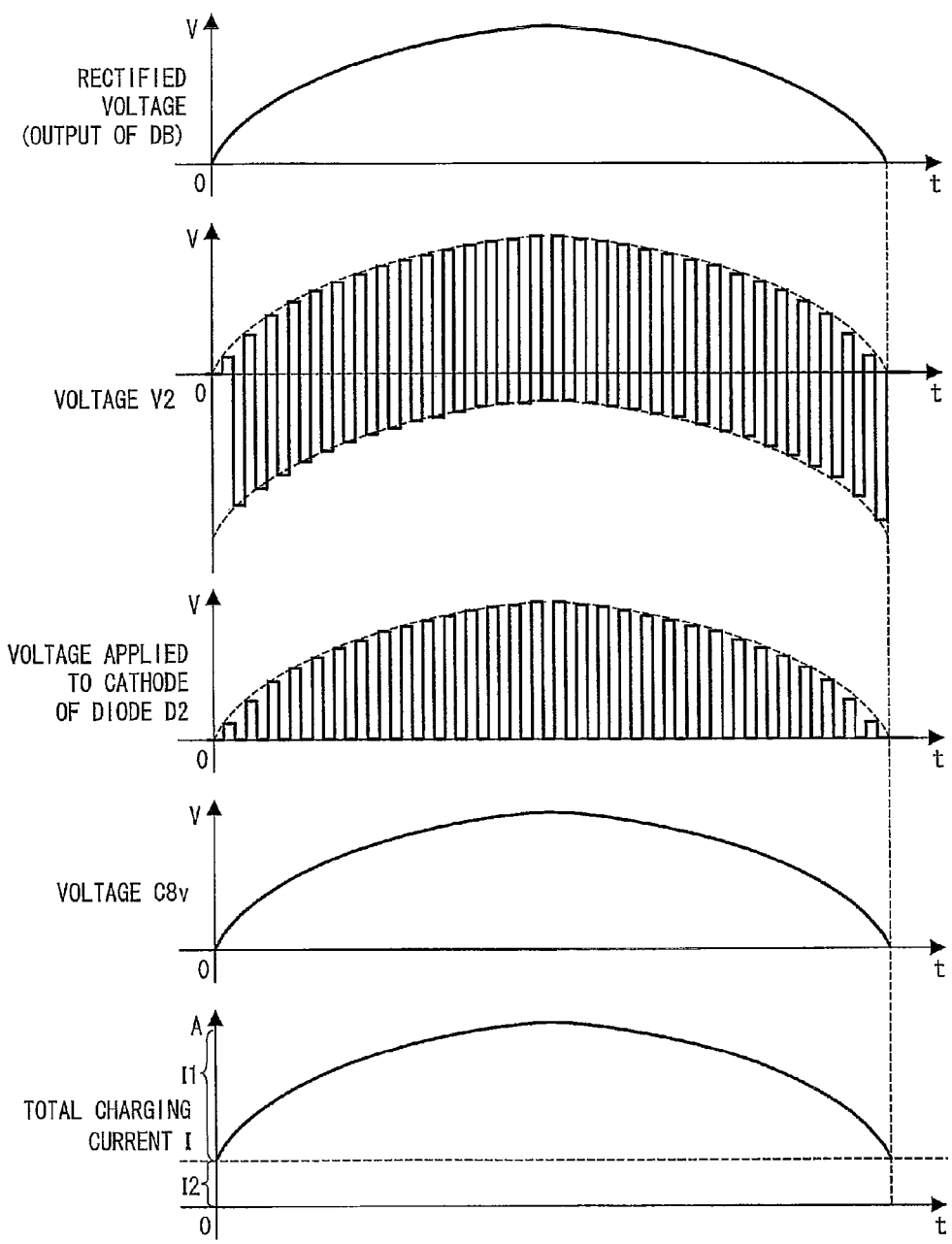
FIG. 2, showing how a fundamental wave component extraction circuit of one embodiment in accordance with the present invention operates, is a timing chart illustrating signals from various sections.
Figure 3:
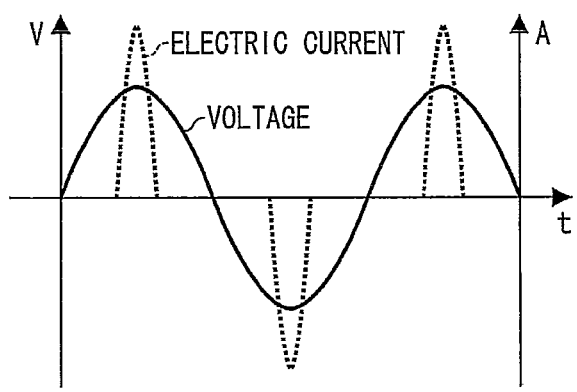
FIG. 3 is a timing chart illustrating how a waveform of an input electric current deviates from a sine wave in a case where no active filter circuit is provided.

FIG. 2, showing how the fundamental wave component extraction circuit 18 of the present embodiment operates, is a timing chart illustrating signals from various sections. The following description discusses, with reference to FIG. 2, how the fundamental wave component extraction circuit 18 operates.

First, a rectified voltage is divided for the purpose of causing an electric current, which is to be supplied to the switching power supply device 1, to be a sine wave. Specifically, in the switching power supply device 1 of FIG. 1, the AC input voltage Vin supplied to the bridge rectifier circuit DB via the filter 11 is rectified so as to be the rectified voltage, and then the rectified voltage is divided by the resistor R1 and the resistor R2. One of thus divided voltages is supplied to the input terminal C of the multiplier 15. Upon reception of the divided voltage, the control circuit section generates the control signal F for controlling the switching element Q1.

The control circuit section (i) generates the control signal F for controlling the switching element Q1 to be in the ON state or the OFF state and (ii) supplies the control signal F to the gate of the switching element Q1. A duty of the control signal F changes according to a change in the oscillation frequency of the clock signal or to a change in a voltage of the smoothing capacitor C4. Specifically, the duty of the control signal F becomes lower as the oscillation frequency of the clock signal becomes higher, whereas the duty becomes higher as the oscillation frequency of the clock signal becomes lower. Similarly, the duty of the control signal F becomes lower as the voltage of the smoothing capacitor C4 becomes higher, while the duty becomes higher as the voltage of the smoothing capacitor C4 becomes lower.

While the switching element Q1 is being in the ON state, the rectified voltage, which is supplied from the bridge rectifier circuit DB and contains a sine wave component (i.e., fundamental wave component) of a commercial frequency, is being applied to the first terminal of the first winding N1 of the inductor L1. As a result, a voltage V2, which is (N2/N1) times the rectified voltage, is induced across the second winding N2 of the inductor L1. The voltage V2 is a voltage induced across the second winding N2 so that the first terminal (indicated by ● (filled circle) of FIG. 1) of the second winding N2 is positive.

While the switching element Q1 is being in the OFF state, a voltage that is a difference between the output voltage Vo and the rectified voltage supplied from the bridge rectifier circuit DB is applied to the second terminal of the first winding N1 of the inductor L1. As a result, a voltage V2, which is (N2/N1) times the voltage which is the difference between the output voltage Vo and the rectified voltage, is induced across the second winding N2 of the inductor L1. The voltage V2 is induced across the second winding N2 so that the first terminal (indicated by ● (filled circle) of FIG. 1) of the second winding N2 is negative.

The fundamental wave component extraction circuit 18 rectifies, by the diode D2, the voltage V2 induced across the second winding N2 of the inductor L1 (that is, the diode D2 extracts a positive component of the voltage V2 induced across the second winding N2). From the voltage V2 thus rectified by the diode D2, the sine wave component (i.e., fundamental wave component) of the commercial frequency is extracted (i.e., averaged; refer to a voltage C8v of FIG. 2) by an RC parallel circuit constituted by the resistor R12 and the capacitor C8.

During a period (i.e., a period during which the voltage V2 is negative) during which no electric current is passing through the diode D2, the resistor R12 discharges electric charge stored in the capacitor C8. In this way, the fundamental wave component is extracted in the fundamental wave component extraction circuit 18.

The voltage C8v, of the capacitor C8, which contains the fundamental wave component is applied to the first terminal of the capacitor CT of the oscillator 19 via the resistor R13 (resistor for level adjustment). In response to application of the voltage C8v, an electric current I1 passes through the capacitor CT. The electric current I1 changes according to a change in the fundamental wave component of the commercial frequency. Further, a constant electric current I2 supplied from the oscillator 19 passes through the capacitor CT.

Accordingly, a total charging current I (I=I1+I2) of the capacitor CT changes as illustrated in FIG. 2 as the electric current I1 changes (i.e., as the voltage C8v of the capacitor C8 changes) as above. This makes it possible to cause the oscillation frequency of the oscillator 19 to change according to a change in the sine wave component of the commercial frequency. That is, it is possible to modulate a frequency according to the sine wave component of the commercial frequency.

As described above, the oscillation frequency of the oscillator 19 changes according to the change in the sine wave component of the commercial frequency. Accordingly, frequencies of a signal (PWM signal) supplied from the switching element Q1 are dispersed within a certain range. Accordingly, frequency components of noise, which is returned to an input terminal of the switching element Q1, are dispersed within a certain range according to the switching frequency. As a result, noise (voltage noise) having a frequency exists independently of other noise having another frequency. This prevents superimposition of noise, thereby reducing a voltage level of noise.

Note here that the noise returned to the input terminal of the switching element Q1 is noise caused by the recovery current.

Further, according to the power factor improvement circuit 2 of the present embodiment, the inductor L1 includes the first winding N1 and the second winding N2. The first winding N1 and the second winding N2 are magnetically connected with each other. This makes it possible to (i) transform a high voltage induced across the first winding N1 into a low voltage induced across the second winding N2 and then (ii) supply the low voltage to the fundamental wave component extraction circuit 18.

The fundamental wave component extraction circuit 18 is not restricted by the safety standards because it operates at a low voltage. This makes it possible to reduce, as much as possible, a creepage distance between parts of the fundamental wave component extraction circuit 18 and wires adjacent to the parts, thereby further reducing a size of the switching power supply device 1.

Further, assume that the power factor improvement circuit 2 stops being operated for the purpose of suppressing electric power consumption to a maximum extent for example when the switching power supply device 1 supplies electric power to a light load (load that consumes less electric power). In this case, there is no power loss that is due to the resistor R13 and the resistor R12 (that is, there is no heat generation from the resistor R13 and the resistor R12) because no voltage V2 is induced across the second winding N2 of the inductor L1.

The power factor improvement circuit 2 stops operating for example in response to an external signal (light load signal). Specifically, the oscillator 19 stops operating in response to the external signal. Accordingly, the switching element Q1 stops being repeatedly turned ON and OFF. As a result, no electric power loss occurs in the switching element Q1, thereby achieving low electric consumption.

Embodiments of the present invention are not limited to the description of the embodiments above, and therefore can be variously altered. Although the embodiments above discussed a configuration in which oscillation frequencies of the switching element Q1 of the power factor improvement circuit 2 are dispersed, the present invention is not limited to this configuration. For example, the following configuration is also available; the voltage C8v of the capacitor C8 of the power factor improvement circuit 2 is applied to a capacitor of an oscillator of a DC/DC converter via the resistor R13, which DC/DC converter is provided in a stage subsequent to the switching power supply device 1 and carries out a PWM control with a switching frequency fixed. That is, the DC/DC converter has an input terminal which serves as an output terminal of the switching power supply device 1. According to this configuration, it is possible to disperse oscillation frequencies of a switching element of the DC/DC converter. For example, in a case where an output voltage Vo of the power factor improvement circuit 2 is 400 V (high voltage), an output voltage of the DC/DC converter is 5 V through 24 V (low voltage).

The switching power supply device can be configured such that the plurality of windings of the inductor include a first winding and a second winding magnetically connected with each other. Further, the switching power supply device can be configured such that the first winding has a first terminal connected with the first terminal of the first smoothing capacitor and a second terminal connected with the drain of the switching element. Further, the switching power supply device can be configured such that the number of turns of the second winding is smaller than the number of turns of the first winding and the fundamental wave component extraction circuit extracts a fundamental wave component of a voltage induced across the second winding.

The inductor includes the first winding and the second winding, which are magnetically connected with each other. This makes it possible to transform a high voltage induced across the first winding into a low voltage induced across the second winding, and thus possible to supply the low voltage to the fundamental wave component extraction circuit.

Since the fundamental wave component extraction circuit operates at the low voltage, the fundamental wave component extraction circuit is not restricted by the safety standards. Accordingly, it is possible to reduce, as much as possible, a creepage distance between parts of the fundamental wave component extraction circuit and wires adjacent to the parts, thereby further reducing a size of the switching power supply device.

Further, the switching power supply device can be configured such that the fundamental wave component extraction circuit includes a diode having an anode to which the voltage induced across the second winding of the inductor is applied. Further, the switching power supply device can be configured such that the fundamental wave component extraction circuit includes a first resistor having a first terminal connected with a cathode of the diode and a second terminal connected with the source of the switching element. Further, the switching power supply device can be configured such that the fundamental wave component extraction circuit includes (i) a capacitor connected in parallel with the first resistor and (ii) a second resistor having a first terminal connected with the cathode of the diode and a second terminal connected with the oscillation circuit.

The diode rectifies the voltage induced across the second winding (that is, extracts a positive component of the voltage induced across the second winding).

From the voltage rectified by the diode, the fundamental wave component is extracted by an RC parallel circuit which is constituted by the first resistor and the capacitor. Specifically, during a period during which no electric current is passing through the diode (i.e., a period during which the voltage induced across the second winding is negative), the first resistor discharges electric charge stored in the capacitor. In this way, the fundamental wave component is extracted.

The voltage, of the capacitor, which contains the fundamental wave component is applied to the oscillation circuit via the second resistor. This makes it possible to cause the oscillation frequency of the oscillation circuit to change according to a change in the voltage, of the capacitor, which contains the fundamental wave component.

The invention is not limited to the description of the embodiments above, but may be altered within the scope of the claims. An embodiment based on a proper combination of technical means disclosed in different embodiments is encompassed in the technical scope of the invention.

INDUSTRIAL APPLICABILITY

A switching power supply device in accordance with the present invention is capable of reducing, at low cost, noise components at a switching frequency and harmonics of the switching frequency. Therefore, the present invention is suitably applicable to all kinds of switching power supply devices. Out of those, the present invention is particularly suitably applicable to a switching power supply device for use in a medical device etc.

| Reference Signs List | |
|---|---|
| 1 | Switching power supply device |
| 2 | Power factor improvement circuit |
| 11 | Filter |
| 13 | Voltage sense operational amplifier (Control circuit section) |
| 15 | Multiplier (Control circuit section) |
| 17 | Current sense operational amplifier (Control circuit section) |
| 18 | Fundamental wave component extraction circuit |
| 19 | Oscillator (Oscillation circuit, Control circuit section) |
| 21 | Inverter (Control circuit section) |
| 23 | PWM comparator (Control circuit section) |
| 25 | RS flip-flop circuit (Control circuit section) |
| 27 | AND circuit (Control circuit section) |
| 50 | Reference voltage supply (Control circuit section) |
| A | Triangular wave signal |
| B | Square wave signal |
| C1 | Smoothing capacitor (First smoothing capacitor) |
| C2, C3, C6 through C8, and CT | Capacitor |
| C4 | Smoothing capacitor (Second smoothing capacitor) |
| D1 | Rectifier diode |
| D2 | Diode |
| DB | Bridge rectifier circuit (Rectifier circuit) |
| E | Output signal |
| F | Control signal |
| I | Total charging current |
| I1 | Electric current |
| I2 | Electric current |
| J | Output signal |
| L1 | Inductor |
| N1 | First winding |
| N2 | Second winding |
| Q1 | Switching element |
| R1 through R3, R5 through R9, and RT | Resistor |
| R4 | Resistor (Current sensing resistor) |
| R12 | Resistor (First resistor) |
| R13 | Resistor (Second resistor) |
| V1 | Voltage |
| V2 | Voltage |
| Vin | AC input voltage (Sine wave voltage) |
| Vo | Output voltage |
| Vref | Reference voltage |

The invention claimed is:

1. A switching power supply device, comprising:

a rectifier circuit for obtaining a rectified voltage by full-wave rectification of a sine wave voltage from an AC source;

a first smoothing capacitor for obtaining a ripple current output voltage by smoothing the rectified voltage, the first smoothing capacitor having a first terminal connected with a first output terminal of the rectifier circuit and a second terminal connected with a second output terminal of the rectifier circuit;

a first series circuit constituted by connecting in series (i) an inductor including a plurality of windings, (ii) a switching element, and (iii) a current sensing resistor, the inductor having a first terminal connected with the first terminal of the first smoothing capacitor and a second terminal connected with a drain of the switching element, the switching element having a source connected with a first terminal of the current sensing resistor, the current sensing resistor having a second terminal connected with the second terminal of the first smoothing capacitor, the inductor receiving the ripple current output voltage via its first terminal;

a second series circuit constituted by connecting in series a rectifier diode and a second smoothing capacitor, the rectifier diode having an anode connected with the drain of the switching element and a cathode connected with a first terminal of the second smoothing capacitor, the second smoothing capacitor having a second terminal connected with the source of the switching element;

a fundamental wave component extraction circuit for extracting a fundamental wave component of a voltage induced across any one of the plurality of windings;

an oscillation circuit for generating a clock signal having an oscillation frequency that changes according to a change in the fundamental wave component; and a control circuit for (a) generating a control signal for controlling the switching element to be in an ON state or OFF state, the control signal having a duty that changes according to a change in the oscillation frequency of the clock signal or a change in a voltage of the second smoothing capacitor and (b) supplying the control signal to a gate of the switching element, the plurality of windings of the inductor, including a first winding and a second winding magnetically connected with each other, the number of turns of the second winding being smaller than the number of turns of the first winding, the first winding having a first terminal connected with the first terminal of the first smoothing capacitor and a second terminal connected with the drain of the switching element, the fundamental wave component extraction circuit extracting a fundamental wave component of a voltage induced across the second winding, the fundamental wave component extraction circuit including:

a diode having an anode to which the voltage induced across the second winding of the inductor is applied;

a first resistor having a first terminal connected with a cathode of the diode and a second terminal connected with the source of the switching element;

a capacitor connected in parallel with the first resistor; and a second resistor having a first terminal connected with the cathode of the diode and a second terminal connected with the oscillation circuit, the second terminal of the first resistor, being electrically grounded, the second winding having a first terminal connected to the anode of the diode and a second terminal electrically grounded.

* * * * *